(12) United States Patent
Brewer

(10) Patent No.: US 10,005,499 B2
(45) Date of Patent: Jun. 26, 2018

(54) SELF-ADJUSTING, SELF-DAMPING AIR SPRING SYSTEM

(71) Applicant: VOLVO GROUP NORTH AMERICA, LLC, Greensboro, NC (US)

(72) Inventor: Robert Renie Brewer, High Point, NC (US)

(73) Assignee: VOLVO GROUP NORTH AMERICA, LLC, Greensboro, NC (US)

( * ) Notice: Subject to any disclaimer, the term of this patent is extended or adjusted under 35 U.S.C. 154(b) by 0 days. days.

(21) Appl. No.: 14/649,969

(22) PCT Filed: Dec. 19, 2012

(86) PCT No.: PCT/US2012/070627
§ 371 (c)(1),
(2) Date: Jun. 5, 2015

(87) PCT Pub. No.: WO2014/098844
PCT Pub. Date: Jun. 26, 2014

(65) Prior Publication Data
US 2015/0314816 A1 Nov. 5, 2015

(51) Int. Cl.
*B60G 11/28* (2006.01)
*B62D 33/06* (2006.01)
(Continued)

(52) U.S. Cl.
CPC .......... *B62D 33/0608* (2013.01); *B60G 11/27* (2013.01); *B60G 11/28* (2013.01);
(Continued)

(58) Field of Classification Search
CPC ... B62D 33/0608; F16F 9/049; B60G 99/008; B60G 11/28
(Continued)

(56) References Cited

U.S. PATENT DOCUMENTS 3,328,019 A 6/1967 Wilson
3,361,444 A * 1/1968 Harbers ............... B60G 17/052
267/64.19
(Continued)

FOREIGN PATENT DOCUMENTS

DE 102008045492 A1 3/2010
EP 1429045 A2 6/2004
(Continued)

OTHER PUBLICATIONS

ISR and Written Opinion (dated Feb. 26, 2013) of corresponding International application No. PCT/US2012/070627.
(Continued)

*Primary Examiner* — Pinel E Romain
(74) *Attorney, Agent, or Firm* — Martin Farrell; Michael Pruden

(57) ABSTRACT

A self-adjusting, self-damping air spring having a first air spring disposed between a cab and a frame of a vehicle and a second air spring in fluid communication with the first air spring. The second air spring positioned relative to the first to provide an opposition force in response to a change in height of the first air spring. This change in height corresponds to a change in displacement between the cab and the frame. The opposition force provided by the second air spring acting to dampen the changes in displacement.

13 Claims, 9 Drawing Sheets

(51) Int. Cl.
   *F16F 9/04*      (2006.01)
   *B60G 11/27*     (2006.01)
   *B60G 99/00*     (2010.01)

(52) U.S. Cl.
   CPC ......... *B60G 99/002* (2013.01); *B60G 99/008* (2013.01); *F16F 9/049* (2013.01); *B60G 2202/152* (2013.01); *B60G 2202/242* (2013.01); *B60G 2204/162* (2013.01)

(58) Field of Classification Search
   USPC .................................................... 296/190.07
   See application file for complete search history.

(56) References Cited

U.S. PATENT DOCUMENTS

| | | | | |
|---|---|---|---|---|
| 4,493,481 A | * | 1/1985 | Merkle | B60G 11/27 267/64.24 |
| 5,044,455 A | | 9/1991 | Tecco et al. | |
| 5,996,980 A | | 12/1999 | Frey et al. | |
| 6,220,585 B1 | * | 4/2001 | Heron | F16F 1/3732 267/152 |
| 6,752,388 B2 | * | 6/2004 | Thurow | F16F 9/0436 267/122 |
| 6,817,597 B1 | * | 11/2004 | Thurow | B60G 11/265 267/122 |
| 6,905,113 B2 | * | 6/2005 | Bank | F16F 9/0454 267/122 |
| 7,226,045 B2 | | 6/2007 | Brookes | |
| 7,487,957 B2 | | 2/2009 | Brunneke et al. | |
| 7,562,750 B2 | | 7/2009 | Lemmens et al. | |
| 7,637,513 B2 | | 12/2009 | Kotulla et al. | |
| 7,802,776 B2 | * | 9/2010 | Behmenburg | B60G 17/0485 188/298 |
| 2003/0034595 A1 | | 2/2003 | Wolf | |
| 2004/0201146 A1 | | 10/2004 | Behmenburg et al. | |
| 2008/0011565 A1 | | 1/2008 | Jaeckel | |
| 2008/0308367 A1 | | 12/2008 | Gilner et al. | |

FOREIGN PATENT DOCUMENTS

| | | |
|---|---|---|
| WO | 2008043630 A1 | 4/2008 |
| WO | 2008131975 A1 | 11/2008 |

OTHER PUBLICATIONS

Extended European Search Report (dated Sep. 12, 2016 of corresponding European application No. 12890466.1.

* cited by examiner

SELF-ADJUSTING, SELF-DAMPING AIR SPRING SYSTEM

FIELD OF INVENTION

This disclosure relates to air springs for suspending truck cabins relative to the vehicle frame. Particularly this disclosure relates to an air spring system which is able to provide self-damping and self-height-adjustment.

BACKGROUND

Air springs, both rolling lobe and bellow, are used in vehicle suspension systems, most often in large commercial trucks. In some instances air springs are used to provide suspension between the truck frame and the wheel axles. In other instances, air springs are placed between the frame and the passenger cab. Traditionally, air springs are fed from a source of compressed air to maintain a predetermined internal pressure. The air springs can be in communication with valves to regulate the pressure and volume or height of the springs. The desired pressure of the air springs is affected by the load on the suspended element (in a truck, the frame or cab). For example, the proper ride height for both the frame and the cab can be obtained by increasing the air spring pressure to accommodate the load on the frame or cab. These air springs have produced an improved ride quality when compared to traditional springs due to a reduced spring rate and reduced natural frequency.

FIG. 1 shows a prior art air spring system 2. The system comprises an air spring 4 and shock absorber 8 disposed between a cab 10 and truck frame 20. The system further comprises a level sensitive air valve 12. The air valve 12 connects to a source of pressurized air 30 by a first conduit 14 and to the air spring 4 by a second conduit 16. Based on the level of the cab 10 relative to the frame 20 (as monitored by a level sensor), the valve 12 will transfer air into the air spring 4, vent air from the air spring 4 to the environment, or seal the air spring to maintain the spacing. These valves 12 can be mechanically adjusted to determine the proper distance between the cab 10 and the frame 20 as is known to those of ordinary skill in the art. Typically, a truck cab will have two air springs 100, one at each corner of the cab 10, as seen in FIG. 2.

Current air spring systems can be less effective when used in rough or off-road environments. During off-road travel, jouncing of the truck can lead to repeated oscillation of the cab 10 relative to the frame 20. This oscillation can continue for long periods, greatly affecting the comfort of the driver. The frequency of input forces from these rough road surfaces can vary greatly. As a result, there is an increased probability for the input frequency to equal one of the natural resonance or harmonic frequencies of the truck or cab structure. This frequency matching or overlapping can multiply greatly the effects felt by the driver and can damage the truck or cab.

Further, prior art air spring systems can allow an uncomfortable roll of the cab when the truck makes a turn. The forces while turning will result in the cab having a desire to lean away from the center of the turn. With the air springs of the prior art, the cab level sensor is located at a center of the cab between the air springs at each corner and may not sense cab roll. Accordingly, the prior art air springs will not change to counter a cab roll event.

As seen in FIG. 1, shock absorbers 8 have been added to prior art air springs to help dampen oscillation. However, resonance occurs at different frequencies for different load conditions of the vehicle. Therefore the single damping force provided by the shock may only provide assistance under certain conditions.

There remains a need for an air spring system that is able to minimize repeating oscillations during a jouncing event. There is a need for an air spring system that provides oscillation damping over a range of road input conditions. There is a need for an air spring system that is able to handle the oscillations during off-road use while maintaining comfort and the proper ride height during highway use. There is also a need for air springs having independent components to reduce cab roll while the truck is turning.

SUMMARY

The invention is directed to as self-adjusting, self-damping air spring system. The air spring system of the invention may be used for a suspension for a vehicle, such as a passenger car, bus, truck, train, or the like, and may be useful in other applications where air spring suspensions are advantageous. The following description is in connection with a suspension for a truck cab on a frame for the purposes of illustration. The air spring system can include a first air spring to be disposed between a cab and a frame of a vehicle and a second air spring in fluid communication with the first air spring. The air spring system is configured such that the second air spring is capable of providing an opposition force in response to a force acting on the first air spring, for example, a force acting to change the distance between the cab and the frame.

According to one embodiment, the first air spring is disposed with a first end on a first side of the frame and the second air spring is disposed with a first end on an opposite side of the frame and the second air spring is connected to the first air spring by a rigid member extending between a second end of the first air spring and a second end of the second air spring to maintain a constant distance therebetween. According to one embodiment, the rigid member is a column disposed within and extending through the first air spring and second air spring. According to an alternative embodiment, the rigid member is a bracket disposed outside of the air springs.

An air spring system may alternatively include the second air spring disposed alongside the first air spring, the second air spring being connected to the first air spring by a bracket rigidly connecting a top of the first air spring to a bottom of the secondary air spring, wherein a bottom of the first air spring is rigidly connected to a top of the second air spring, and, wherein the bracket is movable relative to the bottom of the first air spring and the top of the second air spring such that the first air spring and the second air spring exert forces in opposite directions.

According to the invention, an air spring system includes a first valve, the first valve configured to selectively allow compressed air from a compressed air source into the first air spring when the first air spring is contracted beyond a predetermined height. The air spring system includes a second valve providing the fluid communication between the second air spring and the first air spring, the second valve configured to selectively allowing air from the first air spring to pass to the second air spring when the first air spring is extended beyond a predetermined height. According to one embodiment, the first valve and the second valve are both disposed within the first air spring and the second air spring. Alternatively, the first valve and the second valve may be both disposed outside of the first and second air springs. According to yet another alternative, the first valve is disposed outside of the first and second air springs and the second valve is disposed inside of the first and second air springs.

The air spring system includes a third valve, the third valve capable of releasing pressure from the second air spring to the environment, when the pressure in the second air spring exceeds a predetermined level.

This disclosure also describes a method of damping oscillation between a cabin and a frame of a truck. The method makes use of a source of compressed air and two air springs, at least one of the air springs found between the cabin and the frame. The method can include the steps of determining a desired distance or spacing between the cabin and the frame based on the cabin load; passing air from the first air spring to the second air spring when the distance increases from the desired distance to increase the pressure within the second air spring; and adding compressed air to the first air spring when the distance decreases from the desired distance to increase the pressure in the first air spring. The process of filling the second air spring from the first air spring and refilling the first air spring from the source of compressed air results in an increase in pressure in the air spring system, stiffening the system and reducing displacement between the cabin and the frame.

This disclosure also describes an air spring system for supporting a vehicle passenger cabin relative to a vehicle frame. The air spring system can include a primary air spring and means for damping oscillation of the cabin relative to the frame. Other applications are possible, as mentioned, between the passenger cabin and frame of a bus or train car or between the body and frame of a passenger car, for example.

These and other aspects of the present invention will become apparent to those skilled in the art after a reading of the following description of the illustrated embodiments, when considered in conjunction with the drawings. It should be understood that both the foregoing general description and the following detailed description are exemplary and explanatory only and are not restrictive of the invention as claimed.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 2:
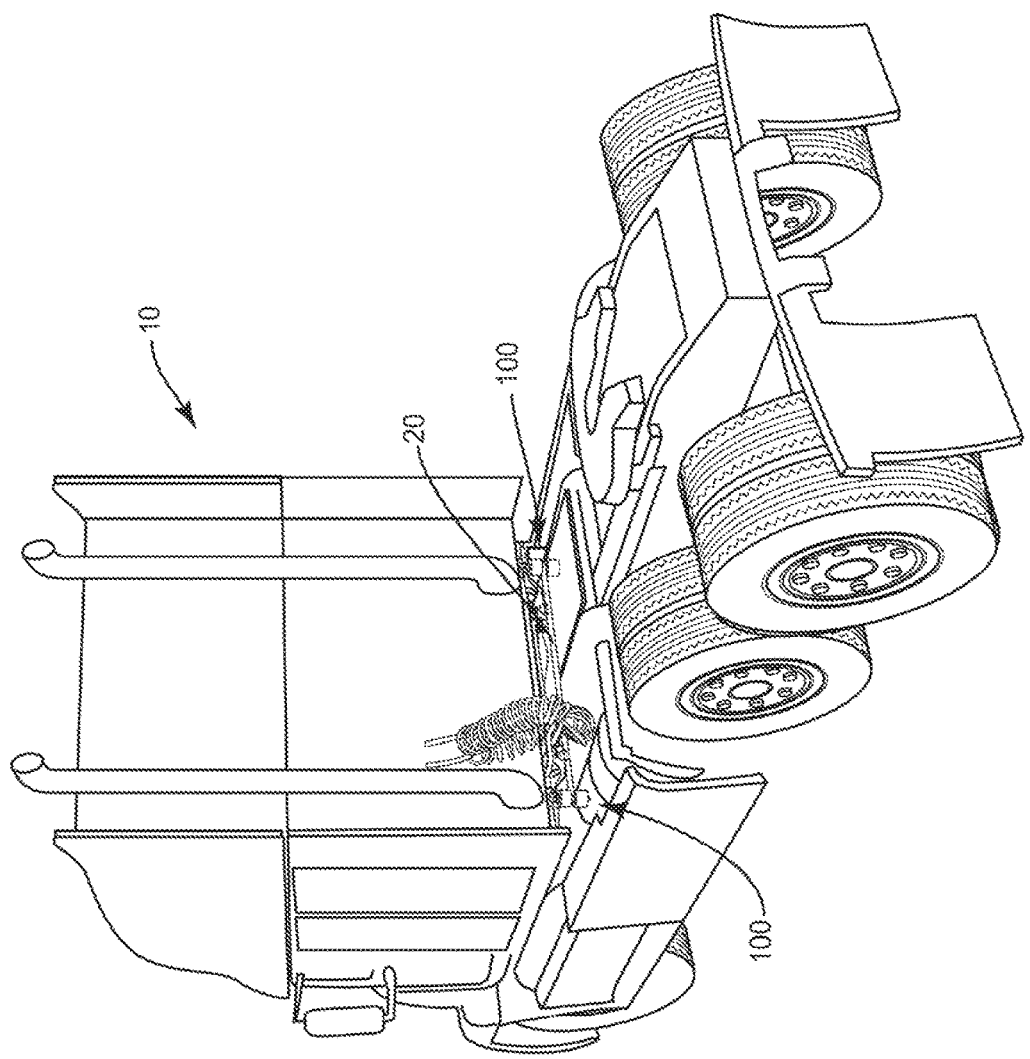
FIG. 2 shows a rear perspective view of a semi-truck with the an spring system of the present disclosure.
Figure 3:
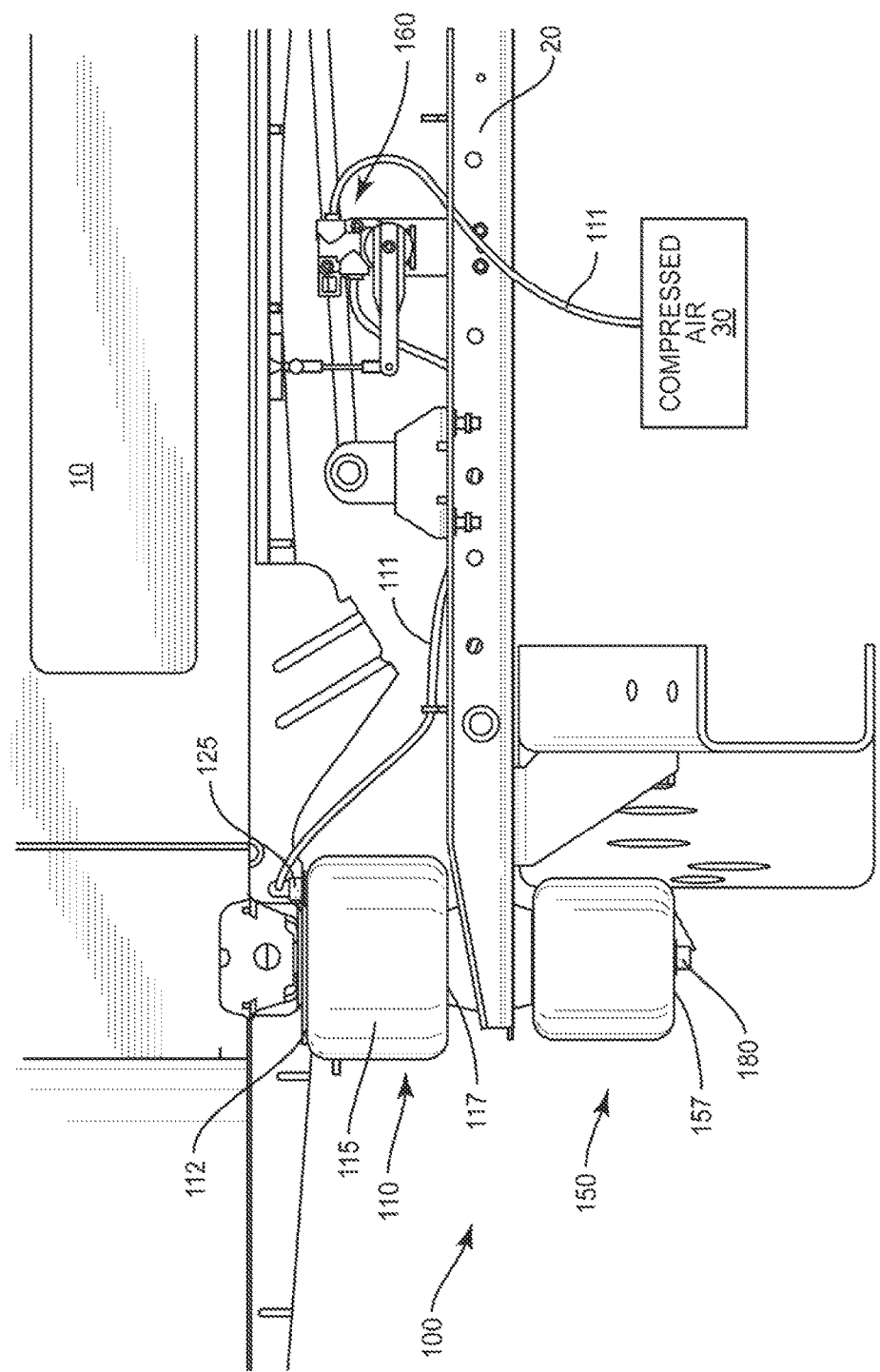
FIG. 3 shows a detailed view of a first embodiment of the air spring system of FIG. 2.
Figure 4:
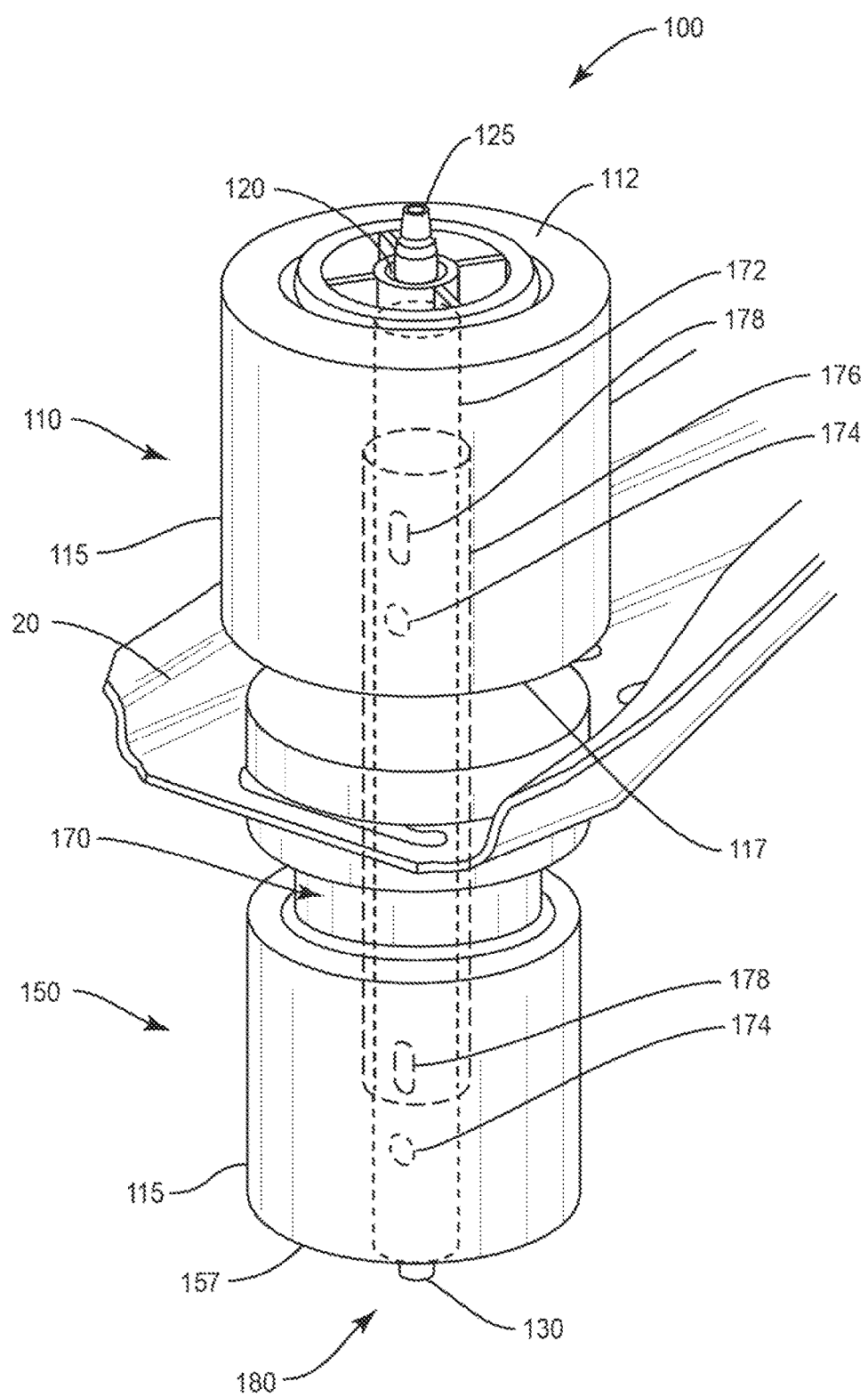
FIG. 4 shows the first embodiment of a self-damping air spring system of the present disclosure.
Figure 5:
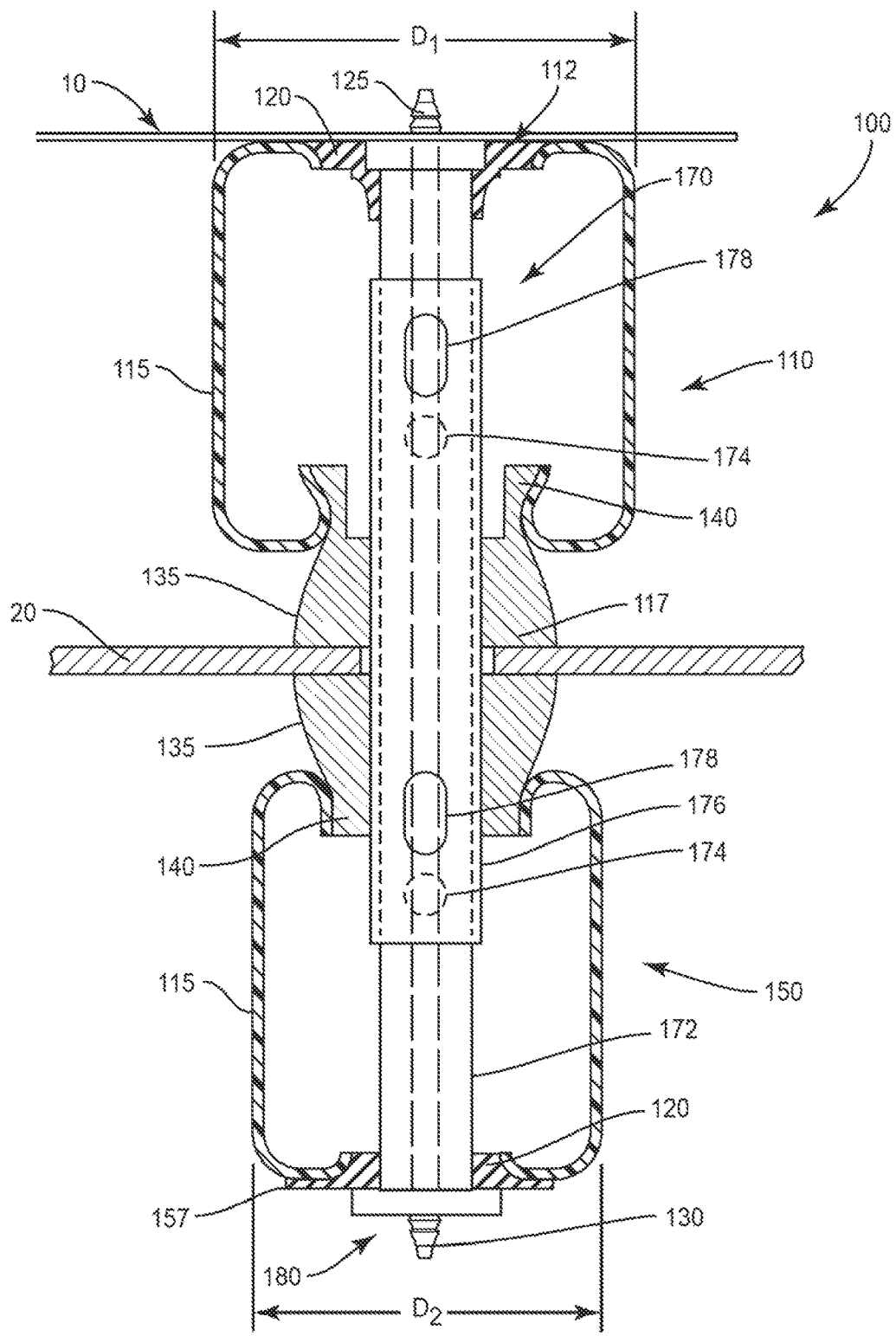
FIG. 5 shows a cross-sectional view of the air spring system of FIG. 4.

FIGS. 2-5 show an exemplary embodiment of the air spring system 100 according to the present disclosure. The air spring system 100 of the invention supports a truck cab 10 on a frame 20, as shown in FIG. 2. Turning to FIGS. 3-5, the system includes a primary air spring 110 disposed between the passenger cabin 10 and a portion of the vehicle frame 20 and a secondary air spring 150 disposed on an opposite side of the frame 20 and connected to the cab 10 in such a way as to act in opposition to the first air spring, as explained below. The secondary air spring 150 is shown connected to the frame 20 below the primary air spring 110 as an advantageous arrangement given space available in the cab 20 and frame mounting arrangement; however, other arrangements are possible, including mounting the secondary air spring above the primary air spring if space allows or mounting the secondary air spring in parallel to the primary air spring as further described below.

The top 112 of the primary air spring 110 is fixed to the cabin 10 and the bottom 117 of the primary air spring 110 is fixed to the frame portion 20. The primary air spring 110 is in communication with a conventional source of compressed air 30 through conduits 111 that will provide air to the primary air spring 110 to produce the proper pressure and spring height based on the cab's load. By varying the pressure in the primary air spring 110 a flexible rolling lobe 115 will expand or contract to provide the proper ride height between the cab 10 and the frame 20. The amount of pressure in the primary air spring 110 will affect the stiffness of the air spring system 100 which relates to the degree of travel between the cab 10 and the frame 20 when the truck encounters a bump in the road.

According to the invention, and as seen in the embodiment illustrated in FIG. 3, the primary air spring 110 communicates with a first valve 160 which in this embodiment is a leveling valve as known in the art. The first valve 160 is located between an air inlet 125 to the primary air spring 110 and the source of compressed air 30, and connected by air conduits 111. The first valve 160 controls the flow of air into the primary air spring 110. Similar to the prior art valve 12, the first valve 160 can function based upon the height of the primary air spring 110, i.e. the first valve 160 adds or releases air based upon the distance between the cab 10 and the frame 20, with the intent of maintaining the cabin 10 at the desired height. When the spacing between the cab 11) and the frame 20 decreases (i.e., the cab moves downward relative to the frame), the first valve 160 will open the flow from a conventional source of compressed air in an attempt to increase the pressure in the primary air spring 110 and raise the level of the cab 10 relative to the frame 20 back to the desired height, similar to a conventional air spring. When the spacing between the cab 10 and the frame 20 increases the cab moves upward, away, from the frame), air is vented from the primary air spring 110 to decrease the distance between the cab and frame. According to the invention, the air vented from the primary air spring 110 is delivered to the secondary air spring 150.

According to an embodiment of this disclosure, and as best seen in FIGS. 4 and 5, the primary air spring 110 and secondary air spring 150 are connected by a second valve 170, which performs a mechanical function and an air communication function. In one embodiment shown in FIGS. 4 and 5, the second valve 170 may be internal to the primary 110 and secondary 150 air springs. The second valve 170 includes a hollow tube 172 attached to a cover plate 120 at the top 112 of the primary an spring 110 (the top being opposite the end connected to the frame 20) and extending to the bottom 157 of the secondary air spring 150 (the bottom being opposite to the end connected to the frame 20) and attached there to a bottom cover plate 120 to provide a rigid connection therebetween. The air springs 110, 150 being mechanically connected by the hollow tube 172 provides that forces acting to expand the primary air spring 110 also act to contract or compress the secondary air spring 150, and forces acting to contract the primary air spring act to expand the secondary air spring.

The hollow tube 172 includes a communication hole 174 in a portion disposed in the primary air spring 110 and a communication hole 174 in a portion disposed in the secondary air spring 150. The second valve 170 also includes a sleeve 176 allowing air communication from the primary air spring 110 to the secondary air spring 150 through the communication holes 174. The second valve 170 is also a displacement valve. As mentioned, the hollow tube 172 is rigidly connected to the top 112 of the primary air spring 110 and the bottom 157 of the secondary air spring 150. The sleeve 176 is connected to a piston 135 mounted on the truck frame 20. Although not illustrated, the piston 135 is advantageously connected to the truck frame 20 by a ball joint to allow pivoting movement of the air spring relative to the truck frame. Expansion and contraction of the air springs 110, 150 causes relative movement of the sleeve 176 on the hollow tube 172. The sleeve 176 includes holes 178 (one disposed in each of the primary air spring 110 and secondary air spring 150) arranged such that as the sleeve 176 and hollow tube 172 translate relative one another the openings 174 move in and out of alignment with holes 178 to open and close the flow of air between the primary air spring 110 and the secondary air spring 150.

Alternatively, the venting function of the second valve 170 can be integrated with the first valve 160. According to this embodiment, exhaust air from the primary air spring 110 would be fed by a conduit back to the external first valve 160 where the flow would be controlled, and a conduit provided to connect the exhaust air with an inlet for the secondary air spring 150. This approach would eliminate the need for a separate internal second valve 170. Note that elimination of the internal valve function does not eliminate, in the embodiment of the FIGS. 3-5, the rigid connection between the top 112 of the primary air bag 110 and the bottom 157 of the secondary air spring 150, which could be provided by a rod.

In an embodiment including a first valve 160 as described above, each air spring system on a vehicle would need an individual first valve if the air spring systems are intended to act independently. According to an advantageous alternative embodiment shown in FIG. 5, the second valve 170 may incorporate an alternative first valve and be directly connected to the compressed air source 30. The conduit 111 carrying air from the compressed air source 30 would be connected to the air inlet 125. The hollow tube 172 is provided with a feed hole 173, and a wall 175 in the hollow tube separate a portion 177 of the hollow tube including the feed 173 (the portion above the wall in the figure) from a portion 179 of the hollow tube carrying air from the primary air spring to the secondary air spring (the portion below the wall in the figure). Relative movement of the hollow tube 172 during an event compressing the primary air spring 115 (the sleeve 172 moving up in the figure relative to the hollow tube) causes the hole 178 to uncover the feed hole 173 allowing compressed air to enter the primary air spring.

Figure 1:
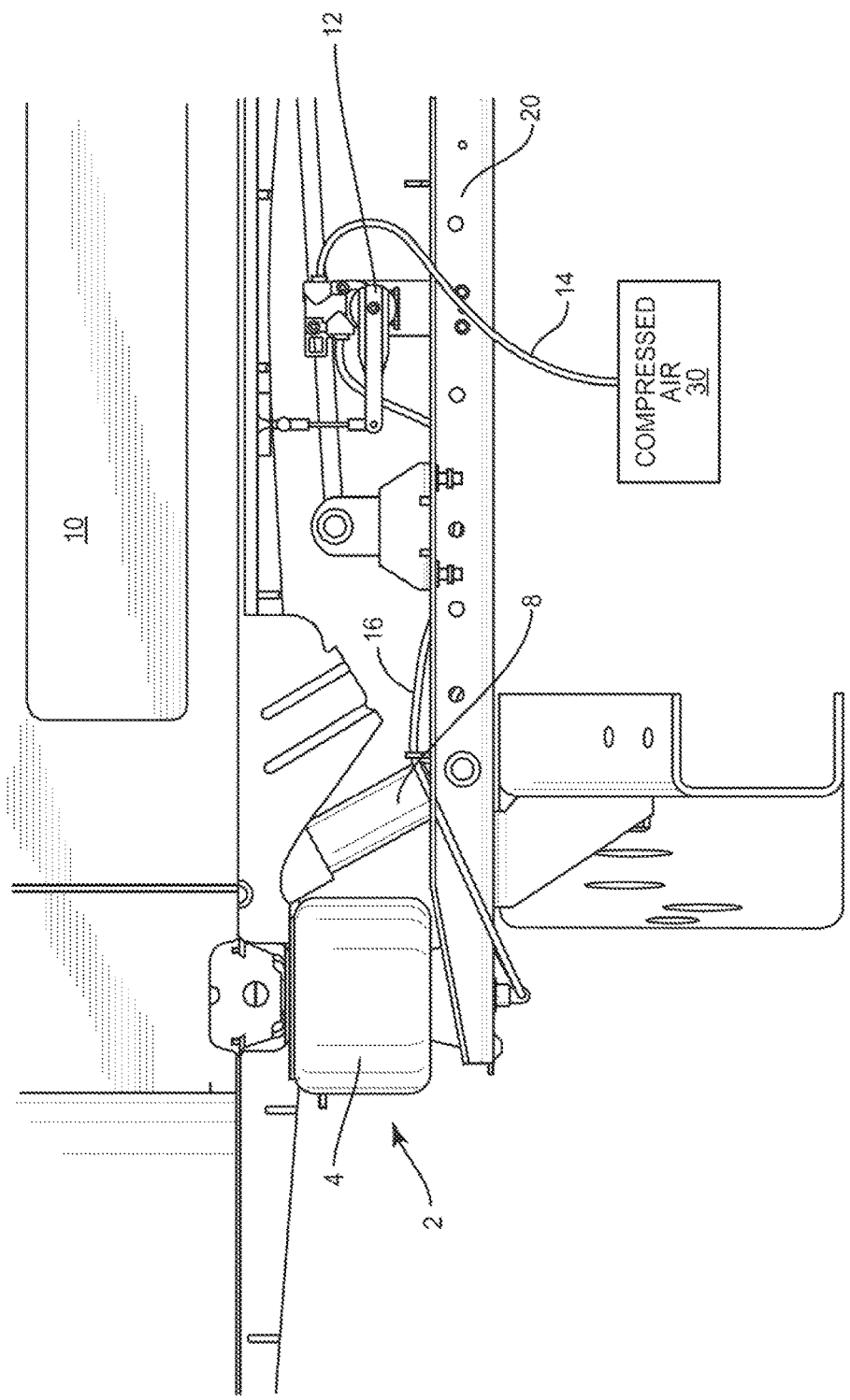
FIG. 1 shows a detailed view of a prior art air spring system.

Referring again to FIG. 1, in the conventional air spring 2, when the spring expands (i.e., the cab 10 and frame 20 move apart), a valve 12 releases air to the environment, thereby lowering internal pressure, in an attempt to reduce the distance between the cab 10 and the frame 20. Referring now to the embodiment of FIGS. 3-5, when the primary air spring 110 expands, the second valve 170 transfers air from the primary air spring to the secondary air spring 150. The expelled air through the second valve 170 from the primary air spring 110 into the secondary air spring 150 increases the pressure in the secondary air spring 150. As a result of this increased pressure in the secondary air spring 150, the secondary air spring 150 will produce an expansion force. Since the spacing between the top 112 of the primary air spring 110 and the bottom 157 of the secondary air spring 150 is fixed by the hollow tube 172, the expansion force from the secondary air spring 150 will act as a force pushing the frame 20 closer to the cab 10.

The first valve 160 and second valve 170 will be configured to have a tolerance for spacing changes between the cab 10 and the frame 20 so not to act to transfer air for small spacing changes (called a "dead band"), as will be determined by the particular vehicle structural and operational characteristics. The dead band for the second valve 170 can be established by the relative spacing of the holes 178 in the sleeve and the holes 174 in the hollow tube 172.

The upward force from the secondary air spring 150, in addition to the continuation of the initial oscillation triggering force, will compress the primary air spring 110 again, reducing the spacing between the cab 10 and the frame 20 causing the first valve 160 to add air from the source of compressed air 30 to the primary air spring. The primary air spring 110 then expands again to raise the cab up to the initial height. The oscillation will possibly create an overcompensation that will start another cycle, sending additional air to further pressurize the secondary an spring 150 through the second valve 170.

The air spring system 100 includes a third valve 180 allowing air to vent from the secondary air spring 150. The third valve 180 can be a pressure release valve with a slow, leak-like flow rate and may be adjustable for flow rate and shutoff pressure. This pressure release valve 180 allows for a slow return back to the desired pre-determined neutral pressure after the primary 110 and secondary 150 air springs are pressurized to dampen oscillation. Therefore the air spring system 100 is able to return to the pre-determined pressure.

This cycle of increasing pressure into the secondary air spring 150 and re-pressurizing the primary air spring 110 with new air continues until the air springs 110, 150 have become sufficiently pressurized that the combined pressure of the air springs 110, 150 restricts further movement of the cab 10 relative to the frame 20 to the deadband, in effect damping out the oscillation motion started by an input from the driving surface.

As best seen in FIGS. 4 and 5, the primary air spring 110 and secondary air spring 150 are mounted on the frame 20 by the piston 135. The piston 135 extends into the volume of each air spring and includes a retainer portion 140. The volume of the air spring is formed by a respective resilient rolling lobe 115 that attaches to the respective covers 120. Each lobe 115 extends from the cover 120 and is folded in upon itself to attach to the retainer portion 140 of the piston 135.

The primary air spring 110, with a diameter of $D_1$, can have a larger diameter than the secondary air spring 150, having a diameter of $D_2$, as shown in FIG. 5. By starting with a smaller initial volume, due to the smaller diameter, the secondary air spring 150 will require less additional air to quickly increase the pressure therein. Having a smaller secondary air spring 150 will also have the added benefit of requiring less packaging space.

The primary air spring 110 may also have an initial pressure of $P_1$ as determined by the desired ride height, and the secondary air spring 150 may have an initial pressure of $P_2$, which may be as low as atmospheric pressure. The initial pressures, are defined as the pressures present when the load and the cab 10 are at the proper height before road conditions produce a jounce or an oscillation. Therefore these initial pressures are adjustable for ride comfort and load conditions. In all cases, $P_1$ will be greater than $P_2$ by an amount sufficient to lift the load of the cab.

Figure 6:
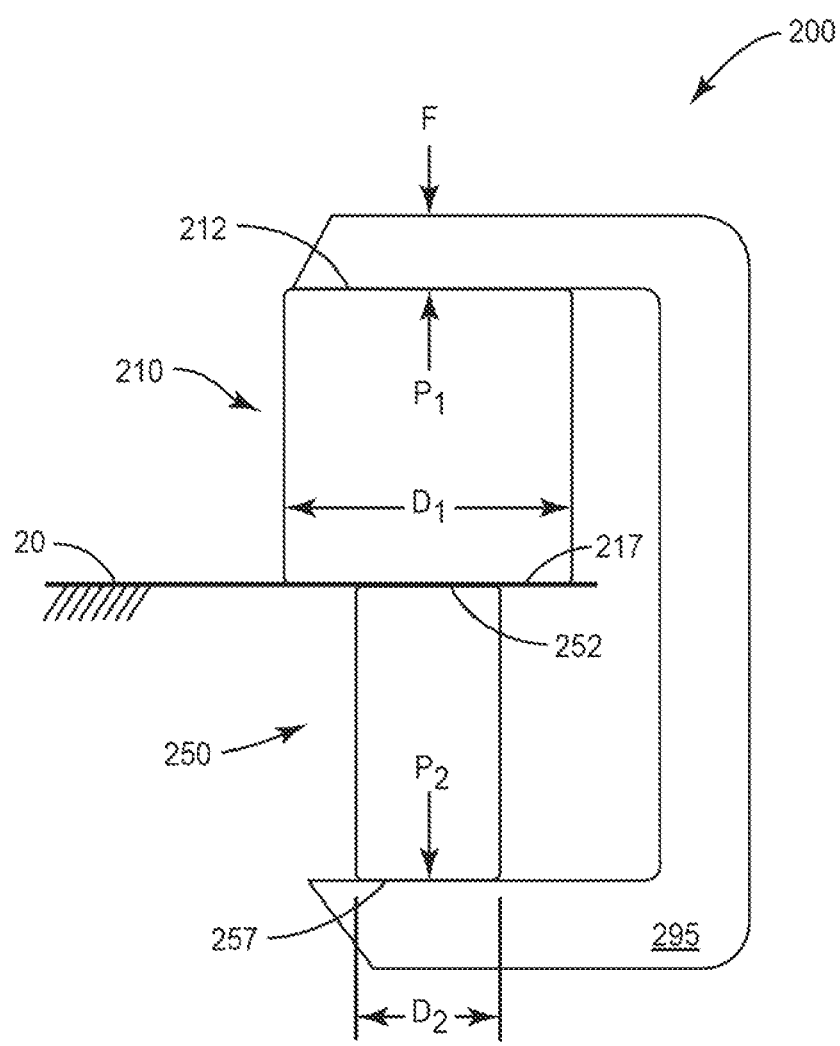
FIG. 6 shows a second embodiment of a self-damping air spring system of the present disclosure.

FIG. 6 shows a second exemplary embodiment of an air spring 200. In this embodiment, the primary air spring 210 and the secondary air spring 250 are attached together using an external rigid bracket 295. As with the first embodiment, the primary air spring 210 is disposed on a first side 217 of the frame 20 and the secondary air spring 250 is disposed on the opposite side 252 of the frame portion 20. Also similar in function to the first embodiment, the C-shaped bracket 295 rigidly connects the top 212 of the primary air spring 210 to the bottom 257 of the secondary air spring 250. The second embodiment of the air spring 200 can have the internal or external valve features as described in connection with the first embodiment of the air spring system 100.

Figure 7:
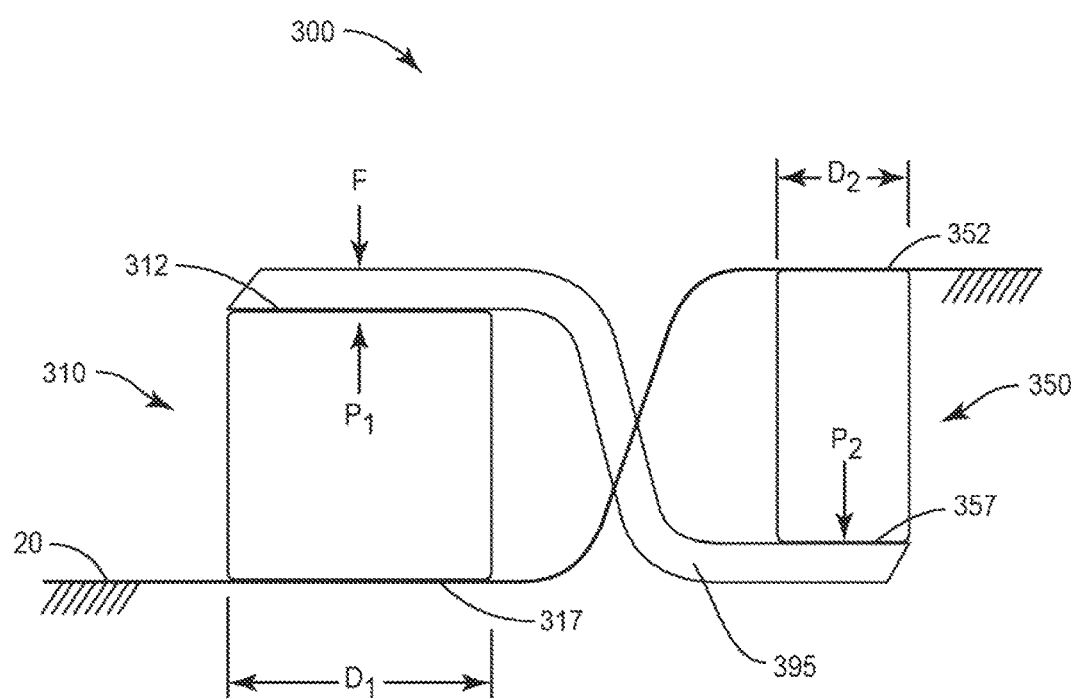
FIG. 7 shows a third embodiment of a self-damping air spring system of the present disclosure.

FIG. 7 shows a third exemplary embodiment of an air spring 300. In this embodiment, the primary air spring 310 can be offset laterally from the secondary air spring 350. The frame portion 20, which may be straight as in the embodiment of FIGS. 3-5 or, as shown configured with an S bend, rigidly connects the bottom 317 of the primary air spring 310 to the top 352 of the secondary air spring 350. A bracket 395, which is configured with an S shape, extends between and connects the top 312 of the primary air spring 310 to the bottom 357 of the secondary an spring 350. In this configuration, although the an springs 310, 350 are offset laterally, the arrangement of the frame portion 20 and the bracket 395 still allow the air springs 310, 350 to provide forces in opposing directions.

Figure 8A:
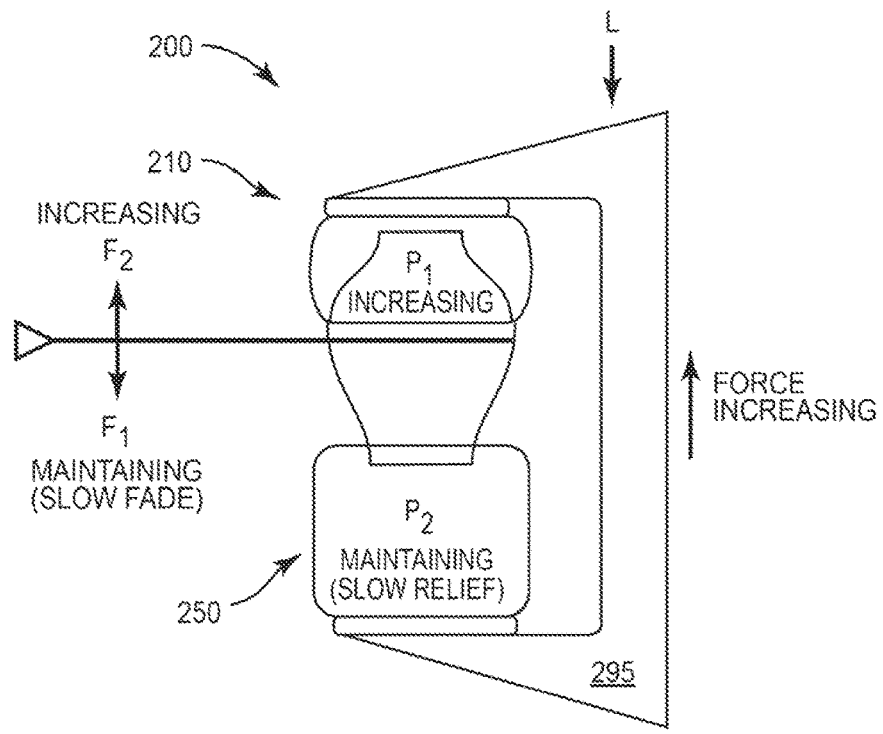
FIG. 8A shows the air spring system of FIG. 6 acted on by a force tending to decrease a distance between a cab and frame.
Figure 8B:
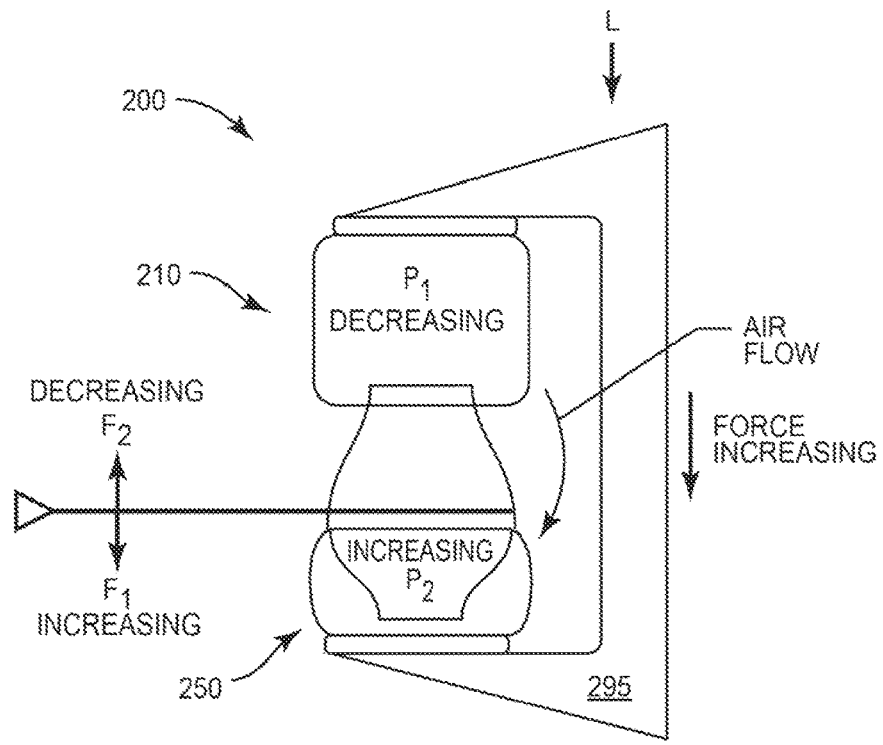
FIG. 8B shows the air spring system of FIG. 6 acted on by a force tending to increase a distance between a cab and frame.

FIGS. 8A and 8B illustrate the functional sequence of the air spring 200. The air spring 200 is subject to external forces $F_1$, $F_2$ and a load force L. It should be understood by one skilled in the art that although the illustration of FIGS. 8A and 8B is similar to the embodiment of FIG. 6, the embodiment of the air spring system 100 shown in FIG. 1 and the air spring 300 shown in FIG. 7 function in the same manner. In all cases, the secondary air spring 250 is disposed relative to the primary air spring 210 on the opposite side of the truck frame with the ends of the air springs not in contact with the frame rigidly connected to each other. Therefore, as shown in FIG. 8A when there is a compression event between the cab 10 and the frame 20, the primary air spring 210 will compress (triggering the addition of air to the primary air spring, which increases the three lifting the cab relative to the frame) and the secondary air spring 250 will expand. By contrast, as seen in FIG. 8B, when there is an expansion event between the cab 10 and the frame 20, the primary air spring 210 will expand (triggering a flow of air from the primary air spring to the secondary air spring) and the secondary air spring 250 will contract (creating a force acting to push the cab and frame together). In both FIG. 8A and FIG. 8B, the action of the air spring system 200 is to return the cab to its desired height relative to the frame The air springs 100, 200, 300 of the present disclosure may be placed adjacent to the two rear corners of the cab 10, or a truck may be provided with a separate air spring system 100, 200, 300 at each corner of the cab 10. In an exemplary embodiment that employs two or more air springs 100, 200, 300 the air springs 100, 200, 300 will be fluidly independent of one another. This way each spring 100, 200, 300 will be able to independently adapt to road condition inputs. For example, the cab 10 of a loaded truck will often lean when taking a corner at speed. The independent operation of the air springs 100, 200, 300 will then operate to oppose, instead of promote this leaning action.

A truck equipped with the exemplary air springs 100, 200, 300 may include a dedicated air tank and compressor as the source of compressed air 30, as shown in FIG. 3. The need for a dedicated source can be determined based on the volume of air required for the air springs 100, 200, 300 to operate, which will change based on the loads to be carried and the pressures to which the air springs 110, 210, 310, 150, 250, 350 are initially tuned. The initial pressures will affect the stiffness of the ride feel.

Figure 9:
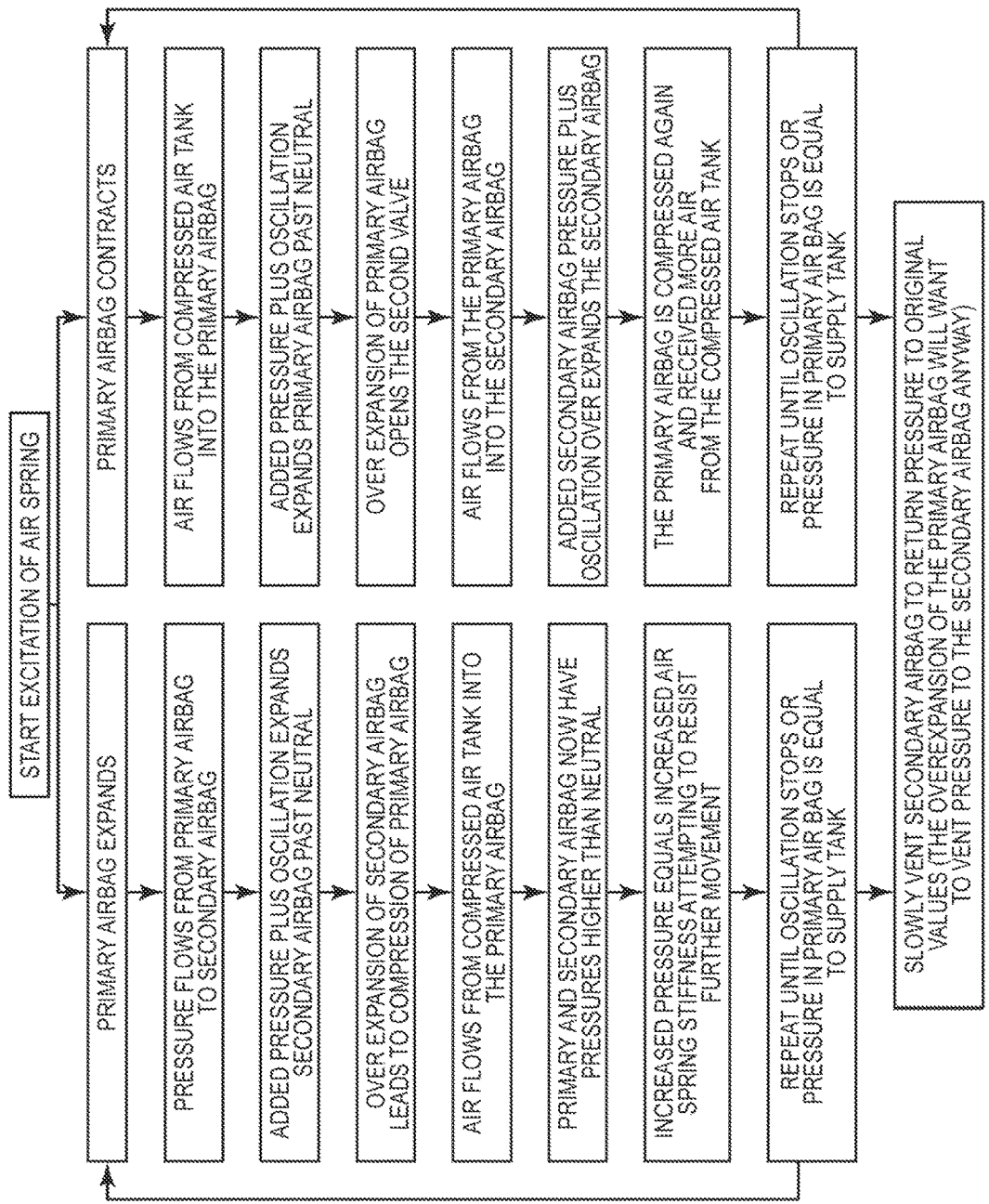
FIG. 9 shows a flow chart which demonstrates the function of the air springs of the present disclosure.

As diagramed in FIG. 9, each of the above air springs 100, 200, 300 performs the following steps to dampen an oscillation event occurring between a cab and a truck. The air spring system 100, 200, 300 should be understood to have some degree of built in tolerance for displacement. The tolerances are provided by the first 160 and second 170 valves, which each require more than a negligible displacement before air/pressure transfer occurs. When the truck rolls over a bump in the road, the air spring system 100, 200, 300 becomes excited resulting in the first air spring 110, 210, 310 either expanding or contracting in height. When the primary air spring 110, 210, 310 expands air will flow from the primary air spring 110, 210, 310 into the secondary air spring 150, 250, 350 to increase the pressure in the secondary air spring. This added air in the secondary air spring 150, 250, 350 will result in expansion of the secondary air spring 150, 250, 350 and compression of the primary air spring 110, 210, 310. When the primary air spring 110, 210, 310 compresses, the first valve 160 will re-pressurize the primary air spring 110, 210, 310 with air from the compressed air tanks. The increased pressure in the secondary air spring 150, 250, 350 will provide an opposition force to the re-expansion of the primary air spring 110, 210, 310. This opposition force acts to dampen the oscillation of the air spring system 100, 200, 300. If the air spring system 100, 200, 300 continues to oscillate, the spring will continue to increase in stiffness as pressure transfers from the primary air spring 110, 210, 310 to the secondary air spring 150, 250, 350 and the primary air spring 110, 210, 310 is refilled by the source of compressed air 30. The cycle ends when oscillation stops, or the pressure in the primary air spring 110, 210, 310, is equal to the source pressure. The equal pressure stops the cycle since no additional air transfer will occur. At this point the air spring system 100, 200, 300 will begin to slowly return to its original height and pressure as air leaks from the secondary air spring 150, 250, 350 via the third valve 180. As the pressure in the secondary air spring 150, 250, 350 slowly declines, any excess pressure in the primary air spring 110, 210, 310 will be able to leak to the secondary air spring 150, 250, 350 since a state of excess pressure is a state of elevated displacement where the second valve 170 will try to transfer air.

If the cycle of cab movement begins with the compression of the primary air spring 110, 210, 310 the first valve 160 will provide additional air into the primary air spring 110, 210, 310 which will over expand the primary air spring 110, 210, 310. Once the primary air spring 110, 210, 310 expands, the process continues as discussed previously and as shown in FIG. 9.

Although the above disclosure has been presented in the context of exemplary embodiments, it is to be understood that modifications and variations may be utilized without departing from the spirit, and scope of the invention, as those skilled in the art will readily understand. Such modifications and variations are considered to be within the purview and scope of the appended claims and their equivalents.

The invention claimed is:

1. A self-adjusting, self-damping air spring system comprising:
    a first air spring to be disposed between a cab and a frame of a vehicle;
    a first valve, the first valve configured to selectively allow compressed air from a compressed air source into the first air spring when the first air spring is contracted beyond a predetermined height;
    a second air spring in fluid communication with the first air spring;
    a second valve providing the fluid communication between the second air spring and the first air spring, the second valve configured to selectively allowing air from the first air spring to pass to the second air spring when the first air spring is extended beyond a predetermined height; and,
    a third valve, the third valve capable of releasing pressure from the second air spring to the environment, when the pressure in the second air spring exceeds a predetermined level,
    wherein the second air spring is connected to the first air spring to provide an opposition force in response to a change in height of the first air spring, the change in height corresponding to a change in distance between the cab and the frame.

2. The air spring system of claim 1, wherein the first air spring is to be disposed with a first end on a first side of the frame and the second air spring is to be disposed with a first end on an opposite side of the frame.

3. The air spring system of claim 2, wherein the second air spring is connected to the first air spring by a rigid member extending between a second end of the first air spring and a second end of the second air spring to maintain a constant distance therebetween.

4. The air spring system of claim 3 wherein the rigid member is a column disposed within and extending through the first air spring and second air spring.

5. The air spring system of claim 3 wherein the rigid member is a bracket disposed outside of the air springs.

6. The air spring system of claim 1, wherein the second air spring is disposed alongside the first air spring;
    wherein the second air spring is connected to the first air spring by a bracket rigidly connecting a top of the first air spring to a bottom of the secondary air spring;
    wherein, a bottom of the first air spring is rigidly connected to a top of the second air spring, and,
    wherein, the bracket is movable relative to the bottom of the first air spring and the top of the second air spring such that the first air spring and the second air spring exert forces in opposite directions.

7. The air spring system of claim 1 wherein the first valve and the second valve are both disposed within the first air spring and the second air spring.

8. The air spring system of claim 1 wherein the first valve and the second valve are both disposed outside of the first and second air springs.

9. The air spring system of claim 1 wherein the first valve is disposed outside of the first and second air springs and the second valve is disposed inside of the first and second air springs.

10. A method of damping oscillation between a cabin and a frame of a truck, the method comprising:
    a) providing a first air spring between the cabin and the frame;
    b) providing a second air spring in fluid communication with the first air spring and positioned to provide a force on the cabin and frame in a direction opposite to a force provided by the first air spring;
    d) monitoring a distance between the cabin and the frame relative to a desired distance based on the truck's load;
    d) passing air from the first air spring to the second air spring when the distance increases from the desired distance to increase the pressure within the second air spring;
    e) adding compressed air to the first air spring when the distance decreases from the desired distance to increase the pressure within the first air spring; and,
    f) releasing pressure from the second air spring to the environment when the pressure in the second air spring exceeds a predetermined level.

11. The method of claim 10, further comprising repeating steps d), e), and f) until the distance remains within a pre-determined range.

12. A truck comprising:
    a passenger cabin suspended above a frame of the truck;
    a first air spring disposed between the cabin and the frame; and
    a first air spring to be disposed between a cab and a frame of a vehicle; and
    a first valve, the first valve configured to selectively allow compressed air from a compressed air source into the first air spring when the first air spring is contracted beyond a predetermined height;
    a second air spring in fluid communication with the first air spring disposed below the frame;
    a second valve providing the fluid communication between the second air spring and the first air spring, the second valve configured to selectively allowing air from the first air spring to pass to the second air spring when the first air spring is extended beyond a predetermined height; and,
    a third valve, the third valve capable of releasing pressure from the second air spring to the environment, when the pressure in the second air spring exceeds a predetermined level,
    wherein the second air spring is connected to the first air spring so that the second air spring is capable of providing an opposition force in response to a change in height of the first air spring, the change in height corresponding to a change in displacement between the cab and the frame.

13. The truck according to claim 12, wherein a first end of the first air spring is fixed to the cabin and a second end of the first air spring is fixed to the frame;

wherein, a first end of the second air spring is fixed to the frame; and, wherein, the first end of the first air spring is connected to a second end of the second air spring.

* * * * *